UNITED STATES PATENT OFFICE.

SAMUEL P. DUFFIELD, OF DETROIT, MICHIGAN.

IMPROVEMENT IN THE MANUFACTURE OF COMMON SALT.

Specification forming part of Letters Patent No. 41,979, dated March 22, 1864.

*To all whom it may concern:*

Be it known that I, SAMUEL P. DUFFIELD, of Detroit, in the county of Wayne and State of Michigan, have invented a new and useful Improvement in the Manufacture of Salt; and I do hereby declare that the following is a full and exact description thereof.

In many localities saline waters occur which contain the chlorides of calcium and magnesium in solution with the chloride of sodium; but it has been found difficult and expensive to separate these chlorides of calcium and magnesium from the brine and make a pure article of common salt. After long study and many experiments, I have succeeded in making common salt economically from such brines, at the same time producing an excellent article.

My invention consists in the manufacture of an improved article of common salt or chloride of sodium, when made from brines or saline waters containing the chlorides of calcium and magnesium, these latter chlorides being separated from the chloride of sodium by means of silicate of potassa or of soda.

My process is varied according to the amount of the chlorides of calcium and magnesium present in the salines employed. Where these chlorides are in great excess, as in the salines of East Saginaw or Bay City wells, in the State of Michigan, I boil the brine rapidly down to crystallization of common salt, and then allow the mother-liquor to run off, thereby removing a large percentage of the chlorides of calcium and magnesium, then enough boiling water is added to make a saturated brine. In order to precipitate the chlorides of calcium and magnesium remaining in this solution, I now add a solution of silicate of potassa or of soda, in the proportion of two parts of anhydrous silicate of potassa or of soda to one part of anhydrous chloride of calcium or magnesium. By the chemical interchange we have a soluble chloride of potassium or sodium, and an insoluble silicate of lime or of magnesia, or both. The precipitate of lime or magnesia soon subsides and may be separated by decanting or filtering the brine, which is afterward evaporated for the crystallization of the common salt. By this process the iron also is removed. If the chlorides of calcium and magnesium are not too abundant, I add the solution of silicate to the original brine, and then decant and evaporate immediately, as above mentioned. I prefer to employ a silicate of potash, made by fluxing in a reverberatory furnace a mixture of common wood-ashes and one-eighth to one-fourth part pure quartz sand, the molten mass being run off, cooled, and then dissolved in water.

I am aware that common salt has been made from brines containing traces of chlorides of calcium and magnesium, all three of the chlorides being precipitated or collected as common salt, the crystals being then washed with a solution of carbonate of soda to remove the chlorides of calcium and magnesium; but this method is too expensive to be applied practically to salines containing a large amount of the chlorides to be removed as impurities. I also know that common salt containing these chlorides of calcium and magnesium as impurities has been manufactured and sold; but such mixtures of the three chlorides, inferior for all purposes, will not preserve meats when packed therewith. Therefore I do not claim either of these, but confine myself to the improved manufacture of salt from salines containing any amount of chlorides of calcium and magnesium, said chlorides being removed by the use of silicate of soda or of potash in solution. Neither do I here claim any new discovery in chemistry; but I limit myself to the new application to the improvement in the art of making common salt.

Having thus described my invention, what I claim, and desire to secure by Letters Patent of the United States, is—

The above-described common salt or chloride of sodium as a new article of manufacture, the same being made from salines containing the chlorides of calcium or magnesium, or both, said salines being purified by the use of a silicate of potash or of soda, substantially as set forth.

SAMUEL P. DUFFIELD.

Witnesses:
G. BREED,
D. BREED.